United States Patent
Bruton

(10) Patent No.: US 6,840,566 B2
(45) Date of Patent: Jan. 11, 2005

(54) ARM SUPPORT FOR VEHICLE DOOR

(76) Inventor: Dalton H. Bruton, P.O. Box 301, Caddo Mills, TX (US) 75135

(*) Notice: Subject to any disclaimer, the term of this patent is extended or adjusted under 35 U.S.C. 154(b) by 0 days.

(21) Appl. No.: 10/622,706

(22) Filed: Jul. 21, 2003

(65) Prior Publication Data

US 2004/0017094 A1 Jan. 29, 2004

Related U.S. Application Data

(60) Provisional application No. 60/398,612, filed on Jul. 26, 2002.

(51) Int. Cl.[7] .................................................. B60J 9/00
(52) U.S. Cl. ................... 296/153; 297/227; 297/411.21
(58) Field of Search ............................... 296/153, 1.08; 297/227, 411.2, 411.21, 411.22, 411.23, 411.35, 411.38, 411.45, 411.46; 108/46; 248/118, 118.1, 118.5

(56) References Cited

U.S. PATENT DOCUMENTS

| | | | | |
|---|---|---|---|---|
| 1,535,771 A | * | 4/1925 | Gustafson | 296/153 |
| 1,756,694 A | * | 4/1930 | Loehr | 296/153 |
| 2,462,768 A | * | 2/1949 | Ortleb | 296/153 |
| 2,504,234 A | * | 4/1950 | Strickland | 296/153 |
| 2,536,895 A | * | 1/1951 | Dowling | 296/153 |
| 2,600,296 A | * | 6/1952 | Jacobs | 296/153 |
| 2,617,679 A | * | 11/1952 | Maguire | 296/153 |
| 2,670,235 A | * | 2/1954 | Susil | 296/153 |
| 2,738,220 A | * | 3/1956 | Simmons | 296/153 |
| 2,803,493 A | * | 8/1957 | Haefliger | 296/153 |
| 3,603,637 A | * | 9/1971 | DePinto | 296/153 |
| 4,592,584 A | * | 6/1986 | White, Jr. | 296/153 |
| 4,810,026 A | * | 3/1989 | Doane | 296/153 |
| 4,890,878 A | * | 1/1990 | Harary et al. | 296/153 |
| 4,950,023 A | * | 8/1990 | Waller et al. | 296/153 |
| 5,004,292 A | | 4/1991 | Horne | |
| 5,893,601 A | | 4/1999 | Carlberg | |

FOREIGN PATENT DOCUMENTS

FR         002682335       *   4/1993   ................. 296/153

OTHER PUBLICATIONS

Author Unknown, Go Pad Armrest Cushion, Web Page [Online], Automotive Interiors website. Original publication date unknown [retrieved Jun. 8, 2003], Retrieved from the Internet. URL:<http://automotiveinteriors.com/gopad.htm>.
Author Unknown, Window Armrest Pad, Web Page [Online], J.C. Whitney, Inc. website. Original publication date unknown [retrieved prior to Jun. 6, 2003], Retrieved from the Internet. URL:<http://www.jcwhitney.com/webapp/wcs/stores/servlet/ProductDisplay?Dx=mode+matchall&productid=432&catalogid=10101&Ntx=mode+matchallany&langid=-1&storeid=10101>.

* cited by examiner

Primary Examiner—D. Glenn Dayoan
Assistant Examiner—H. Gutman
(74) Attorney, Agent, or Firm—Bruce E. Weir

(57) ABSTRACT

An arm support for a vehicle door is an elongated, stiff platform with a lip on one long edge and a support panel on the opposite long edge. The arm support is attached to the vehicle by inserting the lip between the window and the inside edge of the window channel. The platform spans the inner portion of the door. The support panel extends vertically downward from the platform and rests against the door interior. The upper surfaces of the arm support are cushioned. An adjustable stand-off block may be attached to the lower edge of the support panel between the support panel and the vehicle door to adjust the angle of the platform.

7 Claims, 2 Drawing Sheets

ARM SUPPORT FOR VEHICLE DOOR

CROSS-REFERENCE TO RELATED APPLICATION

This application claims priority from provisional patent application Ser. No. 60/398,612, filed Jul. 26, 2002 by the same inventor, now abandoned.

BACKGROUND OF THE INVENTION

The occupants of motor vehicles often seek a more comfortable riding position by resting an arm upon the nearest door. Since the arm rests provided by automobile manufacturers are typically designed and positioned to serve more as door handles than as comfortable arm rests, many vehicle occupants choose to rest an arm on top of the door at the base of the window.

Although this portion of a vehicle door may be better positioned to serve as an arm rest, the upper surface of the door is usually hard, with protruding hardware and a channel for the window. On some vehicles very little flat surface area is available atop a door when the window is rolled up. The vehicle occupant may attempt to compensate by wedging an elbow against the window. Even when the window is open, however, resting an arm on such a surface may quickly become uncomfortable and may lead to injuries, especially for long-distance travelers such as truck drivers.

Attempts have been made to create a temporary, easily-installed, more comfortable upper door surface by attaching a narrow, stiff strip of material to a wider, essentially parallel cushioned strip. The narrow strip is inserted between the inner side of the door window and inner edge of the window channel, affixing the apparatus to the door while allowing the wider, cushioned strip to hang over the top of the door and down into the passenger compartment. This apparatus adds cushioning but does little to enhance the support provided by the top of the door.

Significantly improved support can be provided by a rigid platform. However, a rigid platform is inherently more difficult to adapt to different door shapes without permanently securing the platform to a door, and permanent modifications of vehicle doors are not practical or desirable for most vehicle owners. A preferred design would provide a nearly level, rigid platform that is long and wide-enough to rest an arm comfortably. The platform would be affixed easily and securely to any vehicle door without tools or modifications to the door, yet would be instantly removable.

SUMMARY OF THE INVENTION

The present invention is an arm support that provides these features with a nearly level, rectangular platform that is long and wide enough both to comfortably support an arm and to span the upper interior surfaces of the widest vehicle doors commonly available in the United States. The platform has a narrow, rigid lip attached at an angle to one long edge and a much larger, rigid support panel attached at an angle to the opposite long edge. The lip is inserted between the inner surface of a door window and the inner window channel edge.

The support panel rests against the side of the door facing the vehicle interior, thereby holding the platform in a nearly level position. The angle between the platform and the door window can be adjusted by attaching a suitably-sized block of relatively incompressible material to the lower edge of the support panel between the panel and the vehicle door, causing the support panel to stand away from the door.

As observed previously, a potential limitation of a rigid platform design is the difficulty of accommodating different door shapes. The present invention avoids this limitation by maintaining a distance between the lip and the support panel that is just sufficient to accommodate the widest commonly-available vehicle door without using a stand-off block.

When the present invention is used on narrower doors, a block of appropriate thickness is attached to the support panel to force the support panel away from the door and maintain the desired platform angle. A long, narrow block made of thin, dense layers of foam laminated together provides a means for adjusting the platform angle, with individual layers being peeled off until the desired thickness is reached.

Additionally, the overall dimensions of the arm support fall within ranges that provide support without interfering with door operation. The platform is long enough to comfortably support an arm but short enough to allow the occupant to position the platform in the best spot while avoiding door locks. The lip attaches the arm support securely to the door without impeding window operation. The arm support can be easily installed and will remain secure in the position that best suits a vehicle occupant, without the use of tools or fasteners.

The present invention may be fabricated by several different methods that are known in the art from materials such as polyethylene, nylon, polypropylene, acrylonitrile butadiene styrene, fiberglass, metal, or wood. The present invention may also include various types of foam padding on any or all surfaces. The foam may be covered with any of a variety of fabrics chosen for breathability, durability, ease of maintenance, comfort, and appearance.

All of these features and advantages of the present invention, and more, are illustrated below in the drawings and detailed description that follows.

DETAILED DESCRIPTION OF THE INVENTION

Figure 1:
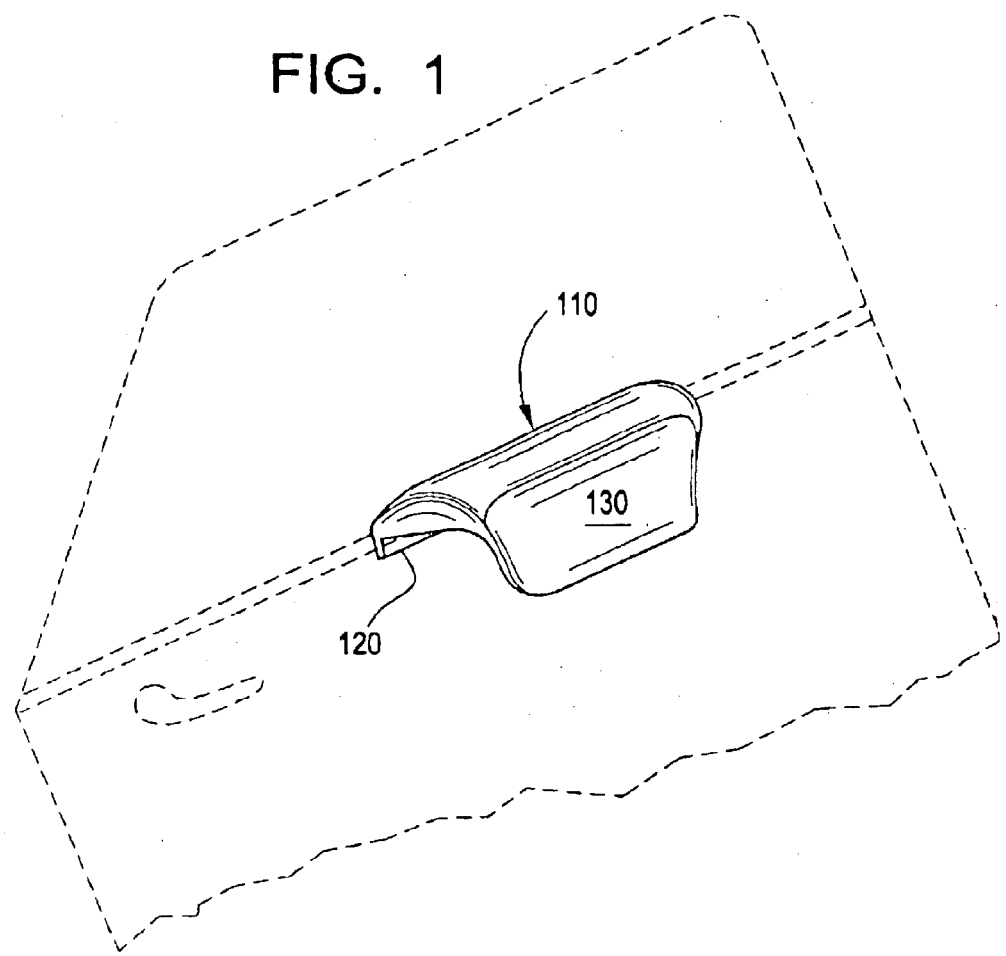
FIG. 1 shows a perspective view of the arm support installed on a vehicle door.

FIG. 1 shows a perspective view of a preferred embodiment of the arm support installed on a vehicle door. The arm support of this embodiment comprises a lip 120, a platform 110, and a support panel 130. The lip 120 is inserted in the vehicle door's window channel, between the window and the inner edge of the channel. The platform 110 spans the inner portion of the vehicle door. The support panel 130 rests against the inside of the vehicle door, holding the platform 110 approximately horizontal.

In a preferred embodiment, the lip 120 and the contiguous edge of the platform 110 are the same length, although they may be of different lengths in alternate embodiments, and the lip may comprise two or more separate sections. The optimum length of the lip 120 and the contiguous edge of the platform 110 has been experimentally determined to be 250 mm, with an acceptable range between 240 mm and 260 mm. A platform 110 shorter than 240 mm does not provide sufficient support. A platform 110 and lip 120 longer than 260 mm will interfere with locks and other operating features of certain vehicle doors, and may be difficult to position properly.

As is visible in FIG. 1, the vertical edges of support panel 130 taper downward, so that in a preferred embodiment the length of support panel 130 diminishes from 250 mm at the top to 180 mm at the bottom.

The lip 120 and the underside of the platform 110 form an angle of approximately ninety degrees. The optimum width of the lip 120 is 22 mm. A greater width may interfere with window operation. A lesser width does not provide sufficient contact area to secure the arm support to the door. The optimum finished thickness of the lip 120 is 3.7 mm. A thinner lip 120 is not secure and a thicker lip 120 may interfere with window operation and cause the support panel 130 to stand away from the door.

Figure 2:
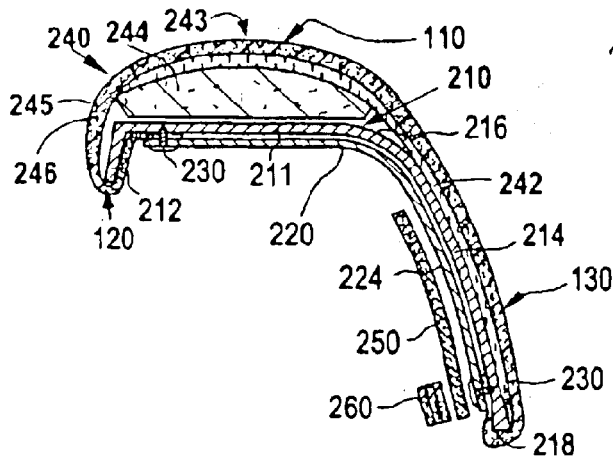
FIG. 2 shows a cross-section of a preferred embodiment of the arm support.

FIG. 2 shows a cross-section of a preferred embodiment of the arm support. In this embodiment, the arm support comprises a frame 210, an insert 220, fasteners 230, and a cushioned cover 240. The arm support may additionally include an insert cushion 250 and a stand-off block 260.

The frame 210 comprises a frame lip 212, a frame platform 211, and frame support panel 214 formed as an integral unit from injection-molded acrylonitrile butadiene styrene plastic as is known in the art. The insert 220 is also formed as an integral unit from injection-molded acrylonitrile butadiene styrene plastic as is known in the art.

In alternate embodiments the frame 210 may comprise separate components assembled by methods known in the art, and both the frame 210 and the insert 220 may be made of polyethylene, nylon, wood, metal, or other materials known in the art. Both components may be formed by extrusion into shapes that may be cut to suitable lengths and any desired angles or bevels cut with equipment well known in the art.

In still another embodiment, the frame 210 and insert 220 are stamped or cut from sheet metal according to a template and bent to desired shapes. All edges are deburred. Foam is bonded to all surfaces of the frame 210 and trimmed to within 2 mm of every edge. Fabric is stretched tightly over all foam surfaces and sewn as close to every edge as is feasible.

In a preferred embodiment, the frame support panel 214 forms an angle between 95 and 105 degrees with the frame platform 211, with a 20 mm radius curve forming a transitional surface 216 between the frame support panel 214 and the frame platform 211. The angle between the frame support panel 214 and the frame platform 211 creates a taper within the frame 210 that improves arm support fit upon a door.

The width spanned by the frame platform 211 between the plane of the frame lip 212 and the lowest portion of transitional surface 216 is 60 mm, widening to 67 mm at the bottom edge of frame support panel 214. The optimum height spanned between the upper surface of the frame platform 211 and the lower edge 218 of the frame support panel 214 is 76 mm. This height may range between 66 mm and 86 mm.

Figure 4:
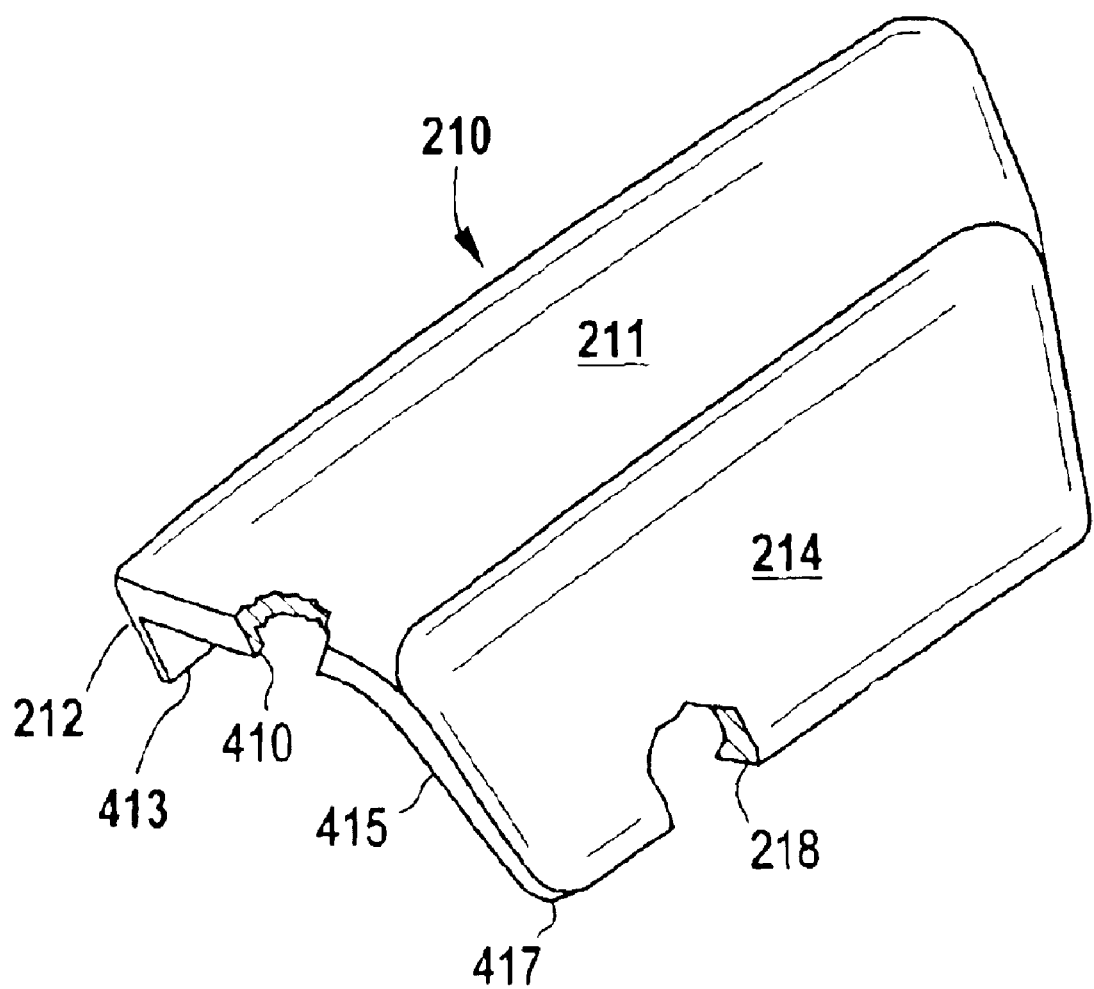
FIG. 4 shows a perspective view of a preferred embodiment of the arm support with broken-out sections revealing the edge contours of the inner surface of the frame.

As shown in FIG. 4, the inside of the lower edge 218 of the frame support panel 214 is flared to a thick edge. A frame end lip 410 starts at the frame lip 212, then runs along the edge 413 of the frame platform 211 and down the edge 415 of the frame support panel 214 to a lower corner 417. A similar frame end lip (not shown) is formed at the opposite end of the frame 210. Together with the flared lower edge 218 of the frame support panel 214, the end lips form a recess in the undersides of the frame platform 211 and the frame support panel 214 to receive the insert 220 (shown in FIG. 2) and provide additional stiffness to the frame 210.

Returning to FIG. 2, the cushioned cover 240 is shown wrapped around and attached to the frame 210. The cushioned cover 240 covers the frame lip 212, the upper portion of the frame platform 211, and the portion of the frame support panel 214 that faces the vehicle interior, wrapping around and under the edges of the frame 210.

In a preferred embodiment, the cushioned cover 240 comprised a laminate of faric and foam. On the exterior of the cushioned cover 240 a shell 243 comprises fabric 245 such as nylon, spandex, polyester, polypropylene, or other fabrics known in the art laminated to a layer 246 of rubber or foam less than 1 mm thick. On the finished arm support, the fabric side of the shell 243 faces outward. The shell 243 is cut to a shape suitable for covering the upper portions and edges of the frame 210.

A layer of 1 mm memory foam 242 is bonded to the interior portions of the rubber or foam side of the shell 243, leaving margins (not shown) around the edges of the cushioned cover 240 where only the shell 243 laminate is present. Optionally, an additional layer of foam (not shown) may be bonded to portions of the memory foam 242 to provide additional cushioning in areas such as the support panel 130.

A platform cushion 244 comprising a block of polyurethane foam, elastomeric gel, or cushioning material known in the art is bonded to the side of the memory foam 242 opposite the shell 243, in a location suitable to position the platform cushion 244 on top of the frame platform 211.

With the platform cushion 244 positioned on the frame platform 211, the shell 243 margins of the cushioned cover 240 that lack memory foam 242 are wrapped around the frame lip 212, the frame end lips 410 (shown in FIG. 4), and the flared lower edge 218 of the frame support panel 214. The margins of the cushioned cover 240 are then bonded with contact cement or otherwise attached to the underside of the frame 210 by methods well-known in the art.

Returning to FIG. 2, the insert 220 is pressed against the underside of the frame 210 and attached with screws 230. In preferred embodiments, several screws 230 are screwed through the edges of the insert 220 into the frame 210 at suitable intervals well-known in the art. In alternate embodiments, the insert 220 may be attached with contact cement or by other means known in the art.

The insert 220 is shaped to conform to the underside of the frame 210. The edges of the insert 220 are cut to fit within the recess formed by the lip 212 (shown in FIG. 4), the end lips 410, and the flared lower edge 218 of the frame support panel 214. When attached to the frame 210, the insert 220 overlaps and covers the margins of the cushioned cover 240.

As shown in FIG. 2, an insert cushion 250 may optionally be bonded to the insert support panel 224 to protect the vehicle door from the screws 230 and the insert 220. The insert cushion 250 may be made of any suitable foam known in the art.

Another optional feature is a stand-off block 260, which is a strip attached to the lower edge of the insert support panel 224 or the insert cushion 250. When the arm support is installed on a vehicle door, a stand-off block rests against the inside of the vehicle door panel. The support panel 130 is thereby forced away from the vehicle door panel and the angle of the platform 110 is adjusted. Selection of a stand-off block 260 of suitable thickness allows a user to quickly adjust the angle of the platform 110 for optimum comfort.

The stand-off block 260 may be made of any relatively incompressible material and may comprise rubber, polyurethane foam, ethylene vinyl acetate foam, or other foams known in the art. The stand-off block 260 is optimally between 70 mm and 83 mm long, 19 mm to 32 mm wide, and 13 mm to 19 mm thick.

In a preferred embodiment the stand-off block 260 is made of three or more layers of dense foam laminated together with contact cement. The contact cement is selected for bonding characteristics that allow the layers to be peeled off individually, so that the thickness of the stand-off block 260 may be easily changed to adjust the arm support to many vehicle door configurations.

Figure 3:
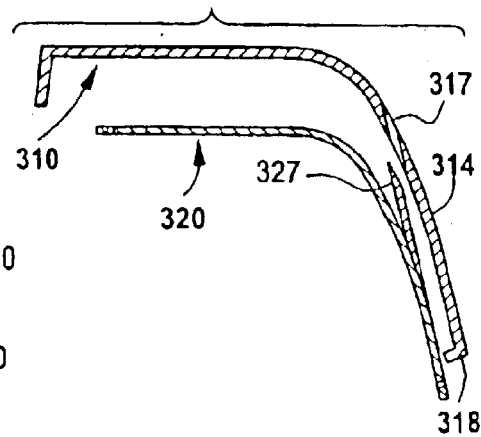
FIG. 3 shows a cross-section of an alternate embodiment of arm support frame and insert.

FIG. 3 shows a portion of an alternate embodiment of the present invention in which the insert 320 has a post 327 shaped and positioned to be received by a receiving slot 317 in the frame 310. The post 327 provides a means of quickly positioning the insert 320 during assembly, and also provides a more secure attachment to the frame 310. The insert 320 and the frame 310 are in other respects similar to those depicted in FIG. 2, except that the lower edge 318 of the frame support panel 314 has a right-angled lip rather than a flared cross-section.

The optimum weight for the finished arm support is between 300 and 350 grams. Additional mass tends to create momentum that dislodges the arm support when the supporting door is slammed.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

What is claimed is:

1. An arm support for a vehicle door, comprising:
   a frame, the frame comprising a platform, a lip, and a support panel;
   the platform having an outer platform edge, an inner platform edge, an upper platform surface, and a lower platform surface;
   the lip having an upper lip edge and a lower lip portion, the upper lip edge being contiguous with at least a portion of the outer platform edge and operable to transmit a mechanical load to the outer platform edge, the lower lip portion operable to be inserted between an inner surface of a vehicle door window and an inner channel edge of a vehicle door window channel;
   the support panel having an upper panel edge, an inner panel surface, and an outer panel surface, the upper panel edge being contiguous with at least a portion of the inner platform edge and operable to transmit a mechanical load to the inner platform edge, and at least a portion of the inner panel surface operable to exert pressure against an interior panel of the vehicle door; and
   a shell, the shell comprising a cover material laminated to a cushioning material, the shell covering at least portions of the lip, the upper platform surface, and the outer panel surface.

2. An arm support as claimed in claim 1, wherein the shell is attached to at least a portion of the frame.

3. An arm support as claimed in claim 1, further comprising an insert, the insert shaped to conform to the lower platform surface and the inner panel surface, the insert attached to the frame so as to secure at least an edge of the shell.

4. An arm support as claimed in claim 3, further comprising a stand-off block, the stand-off block attached to the insert to rest against the interior panel of the vehicle door, thereby positioning the inner panel surface away from the interior panel of the vehicle door and changing the horizontal orientation of the platform.

5. An arm support as claimed in claim 4, wherein the stand-off block has several layers that may be individually separated and removed to change the horizontal orientation of the platform.

6. An arm support as claimed in claim 4, wherein the stand-off block is optimally between 70 mm and 83 mm long, 19 mm to 32 mm wide, and 13 mm to 19 mm thick.

7. An arm support for a vehicle door, comprising:
   a frame, the frame comprising a platform, a lip, and a support panel; the platform, the lip, and the support panel formed as an integral unit;
   the platform having an outer platform edge, an inner platform edge, an upper platform surface, and a lower platform surface;
   the lip having an upper lip edge and a lower lip portion, the upper lip edge being contiguous with at least a portion of the outer platform edge, the lower lip portion operable to be inserted between an inner surface of a vehicle door window and an inner channel edge of a vehicle door window channel;
   the support panel having an upper panel edge, an inner panel surface, and an outer panel surface, the upper panel edge being contiguous with at least a portion of the inner platform edge, and at least a portion of the inner panel surface operable to exert pressure against an interior panel of the vehicle door;
   a shell, the shell comprising a cover material laminated to a cushioning material, the shell attached to at least the lip, and the outer panel surface, and to at least a portion of the lower platform surface and at least a portion of the inner panel surface; and
   an insert, the insert shaped to conform to the lower platform surface and the inner panel surface, the insert attached to the frame so as to secure at least an edge of the shell.

* * * * *